Figure 1:
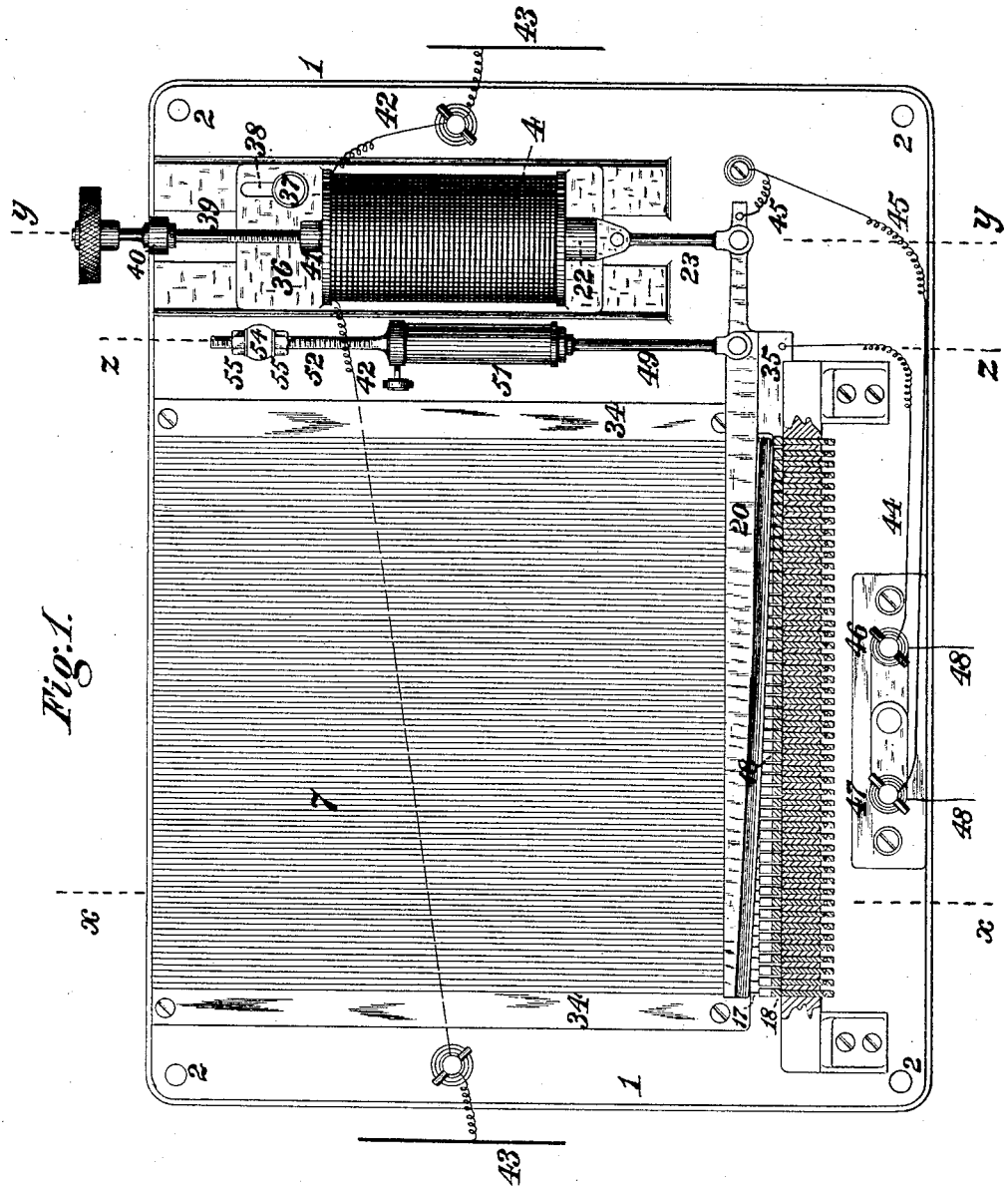

(No Model.) W. STANLEY, Jr. 3 Sheets—Sheet 1.
ELECTRIC REGULATOR.

No. 325,576. Patented Sept. 1, 1885.

Witnesses:
J. Snowden Bell.
C. M. Clarke.

Inventor:
William Stanley, Jr.
by George H. Christy
Atty.

(No Model.)  3 Sheets—Sheet 2.
W. STANLEY, Jr.
ELECTRIC REGULATOR.
No. 325,576. Patented Sept. 1, 1885.
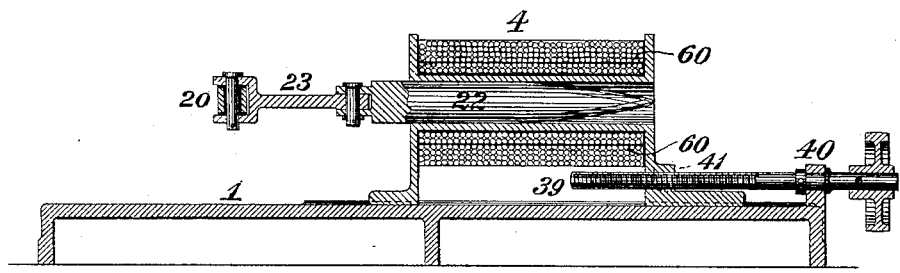
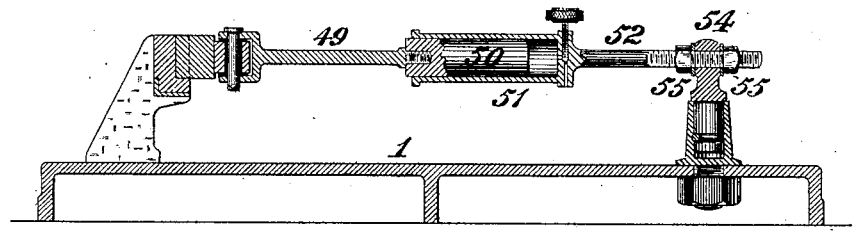
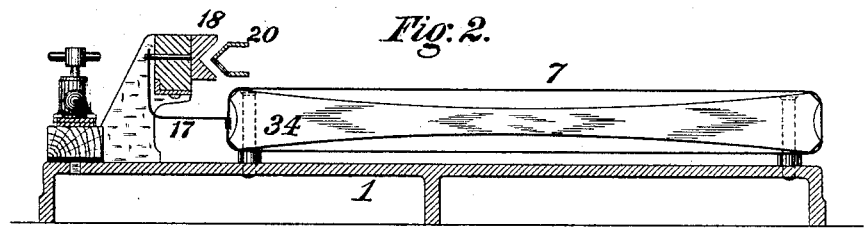
Witnesses.
Inventor.
William Stanley Jr.
by George H. Christy
Atty.

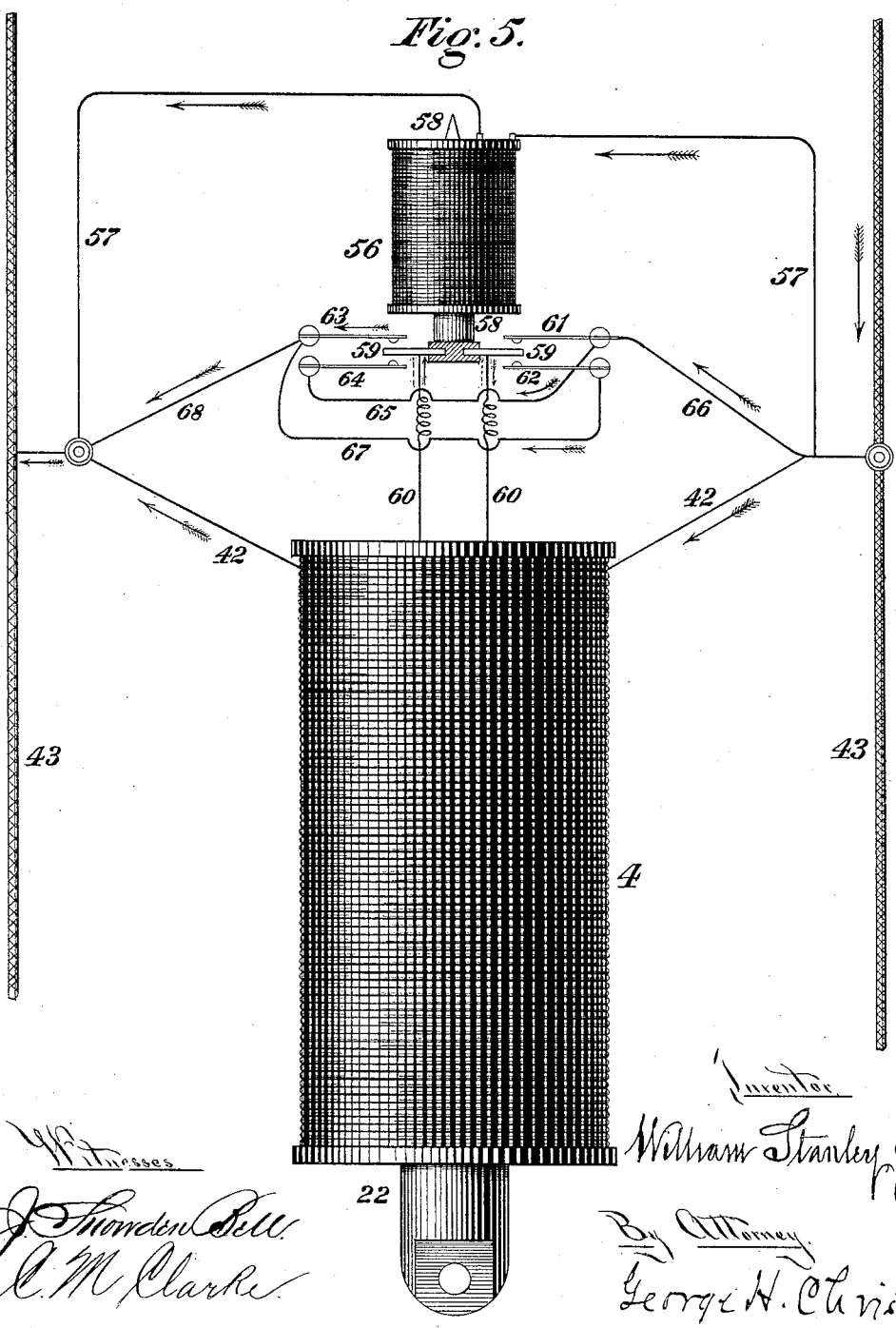

UNITED STATES PATENT OFFICE.

WILLIAM STANLEY, JR., OF ENGLEWOOD, NEW JERSEY.

ELECTRIC REGULATOR.

SPECIFICATION forming part of Letters Patent No. 325,576, dated September 1, 1885.

Application filed August 4, 1884. (No model.)

*To all whom it may concern:*

Be it known that I, WILLIAM STANLEY, Jr., of Englewood, in the county of Bergen and State of New Jersey, a citizen of the United States, temporarily residing at Sewickley, in the county of Allegheny and State of Pennsylvania, have invented or discovered certain new and useful Improvements in Electric Regulators, of which improvements the following is a specification.

In the accompanying drawings, which make part of this specification, Figure 1, Sheet 1, is a front view, partly in elevation and partly in section, of an electric regulator embodying my invention; Figs. 2, 3, and 4, Sheet 2, transverse sections, on an enlarged scale, through the same at the lines $x\ x$, $y\ y$, and $z\ z$, respectively, of Fig. 1; and Fig. 5, Sheet 3, a view in elevation illustrating the application of an auxiliary magnet.

The object of my invention is to provide effective and desirable means for increasing and decreasing the resistance of an electric circuit proportionately to variations in the magnetic strength of an electro-magnet, to the end, more particularly, of acting as a regulator for maintaining a constant difference of potential at the terminals of a dynamo-machine, or maintaining the delivery of a constant quantity of electricity from a dynamo, the apparatus being advantageously applicable for the automatic regulation of electric motors, generators of electricity, and numerous other electrical devices in which it is desired to maintain a constant difference of potential or supply a constant quantity of electricity through the introduction of a variable resistance. The improvements claimed are hereinafter fully set forth.

In an application for Letters Patent of even date herewith I have illustrated the application of my invention in a system for regulating the speed of electric motors to a determined constant, so as to prevent variation of speed under increase or diminution of duty or load by automatically varying the electro-magnetic effect of a demagnetizing-circuit upon the field of the machine through the introduction of a greater or less degree of resistance in said demagnetizing-circuit. Such result is attained through the employment of an apparatus substantially similar to that now to be described.

In the practice of my invention the operative mechanism is mounted upon a supporting plate or frame, 1, which may be fixed by bolts or studs passing through holes 2 in any suitable location. A resistance-coil, 7, of fine wire is wound upon a block or frame, 34, of wood or other non-conducting material, secured upon the supporting-plate 1, one end of said coil being connected to a contact-plate, 35, on the plate 1, and the other to the last of a series of contact-plates, 18, arranged in continuous line and at regular intervals apart below the resistance-coil 7, each of said contact-plates 18 being connected by a wire, 17, with said coil. A regulating-solenoid, 4, fixed to a plate, 36, is connected adjustably, as by a set-screw, 37, passing through a slot, 38, in the plate 36, to the supporting-plate 1, adjacent to one end of the resistance-coil 7, and may be raised and lowered, so as to be adjusted relatively to the line of contact-plates 18, by an adjusting-screw, 39, mounted in a bearing, 40, on the plate 1, and engaging a nut, 41, on the plate 36 of the solenoid. The wire of the solenoid 4 is connected by wires 42 with the mains 43 of the generator, the electro-motive force of which is to be kept constant, and the core 22 of the solenoid 4, which is of greater length than said solenoid, is tapered or curved to a paraboloidal form at its extremity, which is in the direction of the attraction of the solenoid, said extremity projecting slightly through the solenoid when attracted. By this construction the sensitiveness of the solenoid is greatly increased and the length of the pull of the core and the attractive force are more nearly constant through greater lengths of pull by reason of the counter-attraction upon the reduced end of the core when projecting through the coil.

A switch-lever, 20, is coupled at one end by a link, 23, to the end of the core 22, opposite to the direction of the attraction of the solenoid, the switch-lever 20 extending above the series of contact-plates 18, and being, when the core is not attracted, in contact with the first contact-plate, 35, as shown in Fig. 1, in which position the resistance-coil 7 is short-circuited. The contact-plate 35 is connected by a wire, 44, with a binding-post, 46, and the switch-lever by wires 45 with a binding-post, 47. The binding-posts 46 47 are connected by wires 48 with a shunt-circuit upon the field of the generator or motor to be regulated. The lower side of the switch-lever 20 is preferably provided with a double-inclined or V-shaped face, and the contact-plates 18 are correspondingly recessed at top, as shown in Fig. 2. The switch-lever 20 is coupled to the lower end of a rod or bar, 49, the opposite end of which is secured to the piston 50 of a cylinder or dash-pot, 51, containing oil or other liquid, the object of the dash-pot being to cause the movement of the core 22 to be dead-beat—that is to say, to work to a certain point without vibration past it.

The position of the dash-pot relatively to the switch-lever may be regulated as required by a threaded adjusting-stem, 52, connected to the dash-pot, said stem passing through a socket, 54, on the supporting-plate 1, and being provided with nuts 55 above and below the same, by which it may be fixed in desired position.

The lower surface of the switch-lever 20 is slightly curved longitudinally, so that in its oscillating movements, caused by the rising and falling of the core 22, it will make contact with but one of the contact-plates at a time, and will always make contact with one plate before breaking its contact with a preceding plate of the series.

In operation an accretion of the magnetic strength of the solenoid 4, induced by an increase in the quantity of current or difference of potential in the mains 43, causes the core 22 to be attracted, and by its upward movement to elevate the connected end of the switch-lever 20, and by depressing said lever toward its free end to introduce a greater or less portion of the resistance-coil 7, according to the location of the contact-plate 18, with which the lever 20 then makes contact, into the shunt-circuit of which the wires 44, 45, and 48 make part. The introduction of such resistance into the shunt or regulating circuit, by reducing the magnetic strength of the current in the mains 43 to the degree required for the normal operation of the motor or generator, re-establishes the initial strength of the solenoid 4, and maintains a constant difference of potential in, or the delivery of a constant quantity of electricity from, said mains, as the case may be. In any case the apparatus is reactive—that is to say, any difference of attractive strength in the solenoid will, through the resultant movement of the core and switch-lever, induce such resistance in the circuit of the wires 48 as to effect the re-establishment of the initial magnetic strength of the solenoid.

The modification illustrated in Fig. 5 is designed for conditions where it is desired that the strength of the regulating-solenoid shall be established to an extremely accurate and constant degree. To this end an auxiliary solenoid, 56, is located above the regulating-solenoid 4, and is connected by wires 57 with the mains 43. The core 58 of the auxiliary solenoid 56 is constructed similarly to that of the main regulating-solenoid—that is to say, curved or tapered inwardly at its end in the direction of the attraction of its solenoid, and of such length as to project slightly through the same. Any variation of magnetic effect in the solenoids 4 and 56 will be manifested more quickly in the solenoid 56, there being no friction in the movement of its core, which is simply suspended, without performing any mechanical work, while the core of the main regulating-solenoid has the duty of moving the switch-lever 20. Two contact-plates, 59, connected to but insulated from the core 58 of the supplemental solenoid 56, are connected to the terminals of a wire, 60, which forms a supplemental winding upon the main solenoid 4, and springs 61 62 63 64 are arranged in pairs above and below each of the plates 59, so that in the movements of the core 58 the plates may alternately make contact with the upper and the lower springs. The upper spring, 61, of one pair and the lower spring, 64, of the other are connected one with the other by a wire, 65, and with one of the mains 43 by a wire, 66, and the upper spring, 63, of the other pair is connected by a wire, 67, with the opposite lower spring, 62, and by a wire, 68, with the main 43, opposite that to which the springs 61 and 64 are connected.

In operation the effect of the contact of the plates 59 alternately with the upper and lower pairs of springs is to throw the supplemental coil 60 into action to increase the magnetic effect of the main regulating-solenoid 4 whenever the electro-magnetic effect of the auxiliary solenoid 56 is above the determined value, and to throw said supplemental coil into action to decrease the magnetic effect of the solenoid 4 when that of the solenoid 56 is below the determined value, to the end of maintaining constant the electro-magnetic strength of the main regulating-solenoid and of relieving the supplemental effect of the solenoid 56 by a trembling contact between the springs and contact-plates. Such trembling contact induces an undulatory effect in the coil of the solenoid 4, by which the latter is continuously maintained in a sensitive condition, and consequently its moving core will readily follow the rise or fall of the electro-magnetic strength.

It will be obvious that the connection and arrangement of the regulating-solenoid may be varied in accordance with the character of the work to be performed without departing from the spirit of my invention, and in the applications of the apparatus a material advantage results from the fact that a very slight degree of movement of the core is sufficient to effect the introduction and withdrawal of any desired amount of resistance.

I claim herein as my invention—

1. In an electric regulator, the combination of a main regulating-solenoid, a core subject to the attraction of said solenoid, a switch-lever coupled to said core and adapted to make contact with members of a series of plates connected to a resistance-coil at different points in its length, an auxiliary solenoid adapted to be connected to the same terminals as the main solenoid, a core subject to the attraction of said auxiliary solenoid, a pair of contact-plates insulated upon said auxiliary-solenoid core and connected with a supplemental winding upon the main solenoid, and pairs of spring contact-plates located above and below the contact-plates of the auxiliary-solenoid core, and connected alternately with opposite terminals of the auxiliary solenoid, substantially as set forth.

2. The combination of a supporting plate or frame, a resistance-coil wound upon a nonconducting support fixed thereto, a series of contact-plates connected to said coil at different points in its length, a regulating-solenoid connected adjustably to the supporting-frame, an adjusting-screw for varying the position of the solenoid relatively to the contact-plates, and a switch-lever coupled to the core of the solenoid and adapted to make and break contact with successive members of the series of contact-plates by the movements of said core, substantially as set forth.

3. The combination of a supporting frame or plate, a resistance-coil, and a series of contact-plates connected thereto at different points in its length, said coil and plates being fixed upon the supporting-frame, a regulating-solenoid and dash-pot connected adjustably to said frame, and a switch-lever coupled to the core of the solenoid and the piston or plunger of the dash-pot, substantially as set forth.

In testimony whereof I have hereunto set my hand.

WILLIAM STANLEY, Jr.

Witnesses:
   J. SNOWDEN BELL,
   F. C. MILLER.